(No Model.) 2 Sheets—Sheet 1.
S. E. MOWER & T. FOWLER.
SAW MAKING MACHINE.
No. 337,977. Patented Mar. 16, 1886.
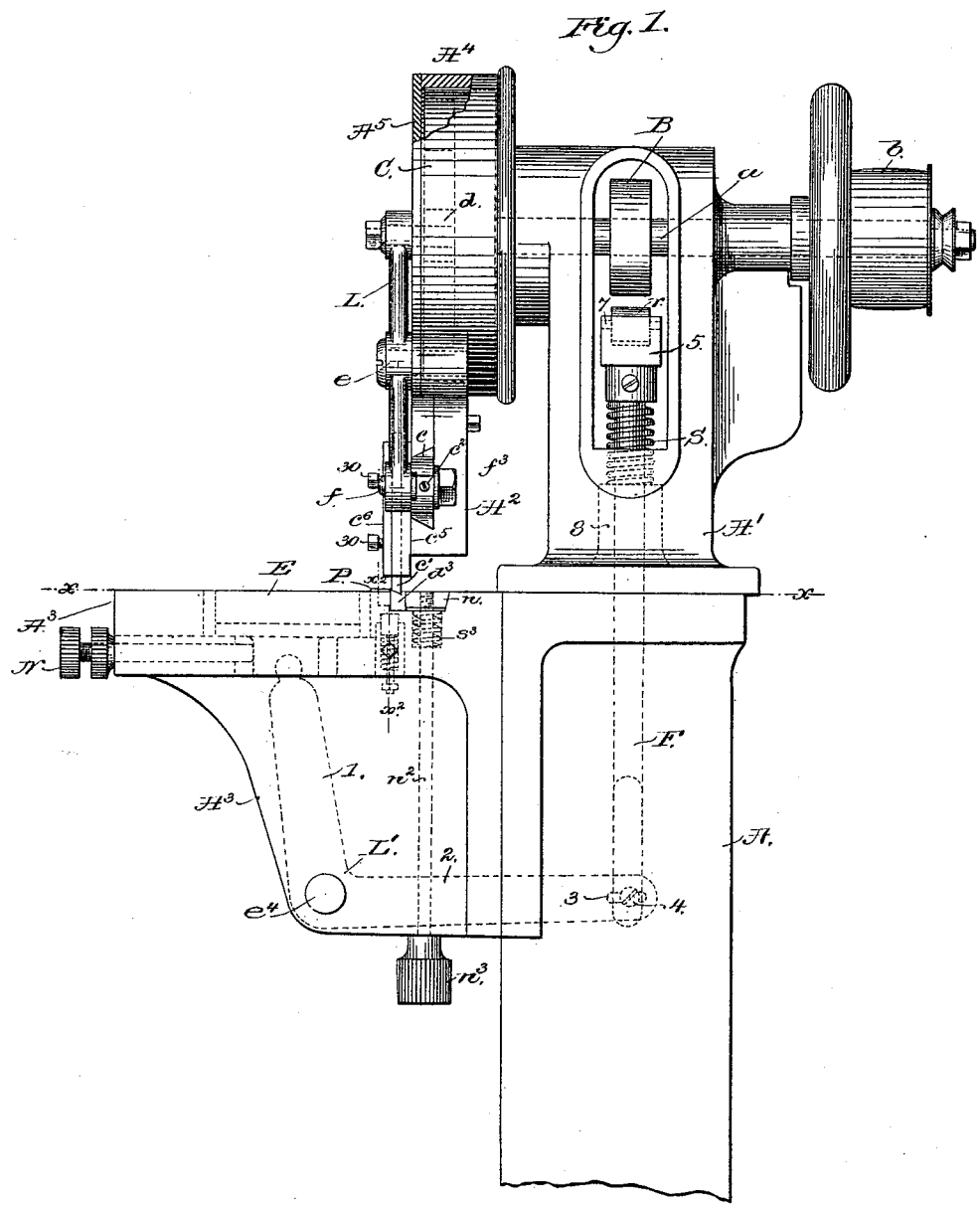

(No Model.) 2 Sheets—Sheet 2.
S. E. MOWER & T. FOWLER.
SAW MAKING MACHINE.
No. 337,977. Patented Mar. 16, 1886.
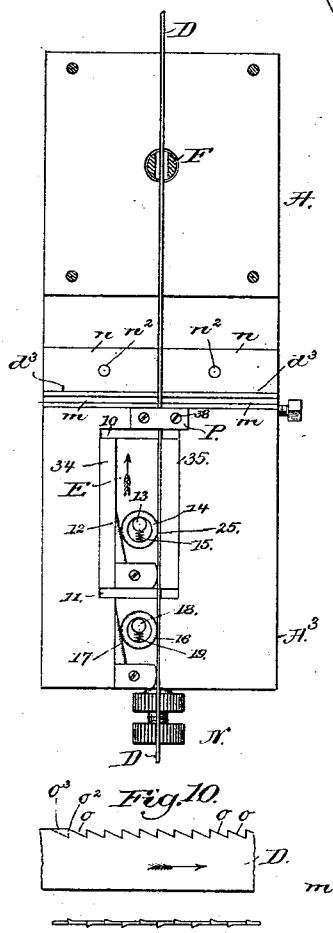
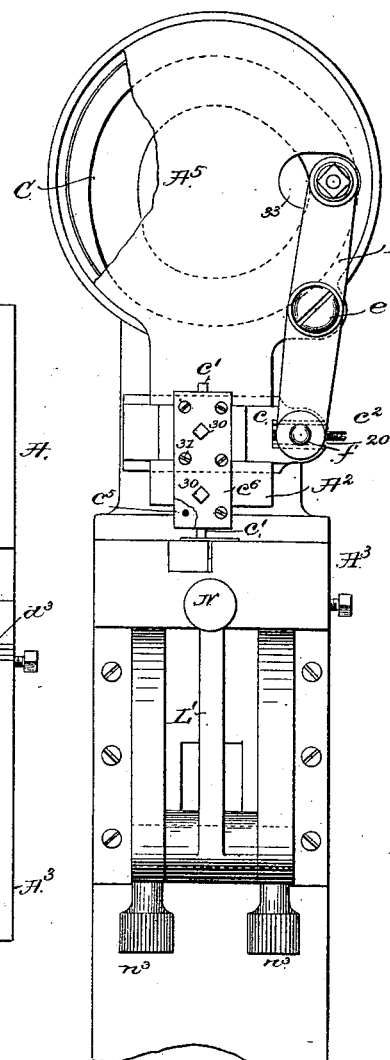
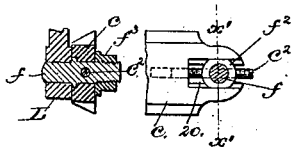
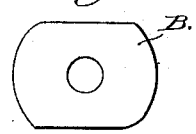
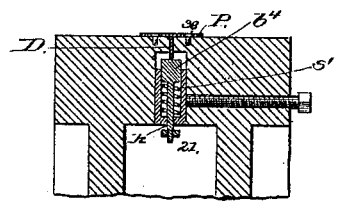
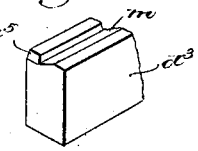
Witnesses.
John F. C. Brinkerh
Fred L. Emery
Inventors.
Samuel E. Mower
Thaddeus Fowler
by Crosby & Gregory
Attys.

UNITED STATES PATENT OFFICE.

SAMUEL E. MOWER AND THADDEUS FOWLER, OF NEW HAVEN, ASSIGNORS TO HENRY G. THOMPSON, OF MILFORD, AND HARRY G. THOMPSON, OF NEW HAVEN, CONN., AND ARTHUR G. THOMPSON, OF NEW YORK, N. Y.

SAW-MAKING MACHINE.

SPECIFICATION forming part of Letters Patent No. 337,977, dated March 16, 1886.

Application filed August 31, 1885. Serial No. 175,729. (No model.)

*To all whom it may concern:*

Be it known that we, SAMUEL E. MOWER and THADDEUS FOWLER, both of New Haven, county of New Haven, and State of Connecticut, have invented an Improvement in Saw-Making Machines, of which the following description, in connection with the accompanying drawings, is a specification, like letters on the drawings representing like parts.

This invention has for its object the construction of a machine by which to rapidly and economically produce saws from strips or bands of metal.

In our improved machine a strip or band fed into the machine is intermittingly acted upon by a tooth-cutting tool while supported first at one and then at its other side by a die, and the teeth are cut and set singly, one after the other, the cut into the strip or band being alternately from opposite sides thereof, and substantially at right angles to the longitudinal center of the said strip or band, the latter being delivered from the machine fully toothed, ready to be cut into suitable lengths, and tempered for use. The strip or band is placed and fed longitudinally between two dies having recesses corresponding in shape and size with that of the pieces to be cut from the strip, in order to leave teeth, and a part of each of the said dies at one side the notch therein is beveled or inclined, in order to permit the tooth being formed to be bent to one side or set, the completion of the cutting of each tooth also serving to set it.

The different parts of the machine are made adjustable to enable strips or bands of different width and thickness to be operated upon for the production of saws, and by changing the tooth-cutting tool and dies and the length of the feed-stroke the size of the teeth may be varied.

Our invention consists in a saw-making machine containing as operative elements dies to support at both sides the metal strip or band to be made into a saw, and a tooth-cutting tool adapted to be reciprocated in a path substantially at right angles to the longitudinal center of the strip or band, the said tool cutting into the strip or band at alternate strokes from opposite sides of the said strip or band.

Our invention also consists in a saw-making machine containing as operative elements dies to support at both sides the metal strip or band to be made into a saw, and a tooth-cutting tool adapted to be reciprocated in a path substantially at right angles to the longitudinal center of the strip or band, the said tool cutting the strip or band at alternate strokes from opposite sides of the strip or band, and a feeding mechanism to intermittingly move the strip or band past the dies and cutting-tool.

Our invention also consists in a die for a saw-making machine, the same consisting of a grooved block having one of its faces beveled to enable the teeth to be set as they are cut, as will be described.

Other features of our invention will be hereinafter described and pointed out in the claims.

Figure 1 in side elevation, partially broken out, represents a saw-making machine embodying our invention; Fig. 2, a front end elevation thereof; Fig. 3, a plan view below the dotted line $x\ x$, Fig. 1, with the strip or band in place; Figs. 4 and 5, sectional details showing the manner of joining the lever and carriage of the tooth-cutting tool. Fig. 6 is a detail showing the actuating-cam removed. Fig. 7 is a section of Fig. 1 in the dotted line $x^2$; Fig. 8, an enlarged end view of the dies; Fig. 9, a detail showing the dies in plan view, the saw being omitted; Fig. 10, a side elevation of part of a saw; and Fig. 11 an edge view of the toothed part, showing the set in the teeth.

The frame-work is composed of a column, A, an upright, A', a depending leg, $A^2$, and a table, $A^3$. The main shaft $a$, mounted in suitable boxes in the upright frame-work A' and driven by a belt on a pulley, $b$, has fastened to it a cam or eccentric, B, and a cam-disk, C, the latter being preferably shielded by a curb, $A^4$, and a cover-plate, $A^5$, partially broken out in Fig. 2. The dies $d^3\ d^5$, to support the metal strip or band D to be toothed at one edge for use as a saw, and placed in grooves in the table $A^3$ and there held with their faces at the proper distance apart, that being according to the thickness of the band or strip, by a wedge-like clamp, $n$, held in place by adjusting-screws $n^2$, having milled heads $n^3$, the screws passing through springs $s^3$, on which the clamp $n$ rests, the springs lifting the clamp when permitted to do so by the screws.

The dies $d^3$ are composed of steel bars grooved longitudinally at $m$, the shape of each groove being the same as that of the pieces of metal to be removed from the edge of the strip or band. That part of the face of each die which is beyond the said groove in the direction of the travel of the band or strip is beveled or inclined, as at $a^5$, to enable the offsetting or bending aside of each tooth as its point is being completed, thus setting the teeth as they are completed. The tooth-cutting tool $c'$, to co-operate with the said dies, which support the strip or band D at both sides, is attached by screws 30 in a vertical groove of an upright part, $c^5$, of the carriage $c$, the latter being shown as of dovetail shape in cross-section, (see Figs. 1 and 5,) and fitted into a groove of dovetail shape cut horizontally in the depending leg $A^2$ of the frame-work.

The upright part, $c^5$, is provided with a face-plate, $c^6$, attached to it by screws 31, the face-plate holding the screws 30, the rear side of the upright part $c^5$ resting against the planed front face of the depending leg $A^2$.

The carriage at one end is slotted, as at 20, (see Fig. 4,) to receive the stud $f$, having a slabbed hub or collar, $f^2$, which fits the said slot. The hub or collar $f^2$ has extended through it an adjusting-screw, $c^2$, provided with a right-and-left thread, one end of the said adjusting-screw entering the carriage and the other end the stud $f$. When in the desired position, the stud is fixed by the set-nut $f^3$. The stud $f$ at its front end receives over it the lower end of the lever L, pivoted at $e$ and provided with the roller or other stud $d$, which, extended through the slot 33 (see Fig. 2) in the plate $A^5$, enters the cam-groove in the cam-disk C, the rotation of the said cam-disk effecting the reciprocation of the carriage $c$ and the movement of the tooth-cutting-tool backward and forward along the grooves $m$ $m$ of the dies, the said tool passing from the groove of one into the groove of the other die, and at such time cutting from the strip or band D, between the dies, a piece of metal to leave a tooth of the desired depth or shape, the tooth-cutting tool at alternate strokes cutting through the band or strip from opposite directions, the band or strip being fed longitudinally during the interval between each stroke of the tool, the same tooth-cutting tool cutting out a piece of metal at each successive stroke to the right and then to the left. The rotation of the screw $c^2$ enables the stroke of the tooth-cutting tool to be regulated with relation to the center of the strip or band D.

The feeding mechanism for the strip or band D is shown as composed of a slide-block, E, provided with a stud, 13, and having at its opposite sides walls 34 and 35, the former having an attached toothed wedge, 12. The stud 13 is surrounded by a toothed ring, 14, a spring, 15, between the stud and the inner side of the ring normally acting to keep the ring pressed into the narrowing space between the wedge and strip D, as in Fig. 3, the periphery of the ring engaging the strip at the point 25, and moving the said strip with the slide-block when the latter is moved in the direction of the arrow thereon (see Fig. 3) by the arm 1 of the lever L', pivoted at $e^4$, the other arm, 2, of the said lever being slotted at 3 and joined by pin 4 to a link, 35, pivoted to the lower end of the slide-rod F in the box, and provided at its upper end with a head, 5, carrying a roller, $r$, which is acted upon by the cam B, (see Fig. 1,) when it is desired to cause the slide-block and the devices described to feed the band or strip forward, the length of the forward or effective stroke being regulated or determined by the screw N, the inner end of which stops the slide-block E sooner or later in its outward movement.

In Fig. 1 the adjustment of the screw N is such as to regulate a short stroke for the feed, the roll $r$ not rising to its full extent as the cam retires, the spring S on the rod F remaining somewhat compressed. As the slide-block E is moved backward the backward movement of the strip or band with it is prevented by a ring, 16, on a fixed stud, 18, co-operating with a fixed but toothed incline 17, the ring 14, during the backward movement of the slide-block E and while the strip or band D is held by the ring 16, being forced toward the point of the incline by its contact with the strip.

For the production of saws having their teeth of uniform depth it is necessary that the upper straight edge of the strip or band being fed past the dies and punch should be kept against a gage, P, and herein the said gage is held down by screws 38. The lower edge of the strip D is acted upon by a plunger, $b^4$, surrounded by a spring, $s'$, both placed in a sleeve, $b^5$, a nut, 21, being on the reduced rod $k$ of the plunger to control the movements.

In operation let it be assumed that the band or strip is placed between the faces of the two dies, each die touching one side of the said band or strip. The intermitting feed of the band or strip is in the direction of the arrow, Fig. 10. The tooth-cutting tool at each stroke to the right and to the left cuts from the band or strip a piece of metal to leave a space, $o$, which outlines the inclined back of one tooth and the vertical face of the tooth next ahead of it, the back of the latter tooth having been formed by the tooth-cutting tool and die at the preceding stroke of the tool in the opposite direction, and as the tool acts to cut into the metal and remove a portion thereof, as shown at $o^3$ by dotted lines, Fig. 10, the said tool first pushes the part of the metal at $o^2$ aside and against the inclined face $a^5$ of the die, and then, the metal becoming firmly seated on the die, the tool cuts through the metal, leaving the part $o^2$, constituting the points of the teeth, turned aside or "set," as it is called, and as shown in Fig. 11.

Prior to our invention we are not aware that a saw has ever been made by punching through a band or strip in one and then in the opposite direction, forming the back and front of two teeth at each stroke, each completed tooth being set singly.

We claim—

1. In a saw-making machine, dies to support at both sides the metal strip or band to be made into a saw, combined with a tooth-cutting tool adapted to be reciprocated in a path substantially at right angles to the longitudinal center of the said strip or band, the said tool cutting into the band or strip from opposite sides thereof at alternate strokes, each stroke of the tool forming the back of one tooth and the front of the tooth next ahead of the tool in the direction of movement of the strip or band, substantially as described.

2. In a saw-making machine, dies to support at both sides the metal strip or band to be made into a saw, combined with a tooth-cutting tool adapted to be reciprocated in a path substantially at right angles to the longitudinal center of the said strip or band, the said tool cutting into the band or strip from opposite sides thereof at alternate strokes, each stroke of the tool forming the back of one tooth and the front of the tooth next ahead of the tool in the direction of movement of the strip or band, and a feeding mechanism to move the strip or band intermittingly, substantially as described.

3. In a saw-making machine, the die provided with a groove for the tooth-cutting tool, and having its face beveled or inclined, as at $a^5$, to enable one tooth to be set as the back of the next tooth is being cut, substantially as described.

4. In a saw-making machine, the two dies $d^3$ $d^3$, and the cutting-tool and its carriage, combined with the lever L, the cam to move it, and the stud and adjustable screw to connect the lever and carriage, substantially as described.

5. In a saw-making machine, the dies $d^3$ $d^3$, slotted bed or table $A^3$, and the gage-plate P, combined with the plunger, to act upon one edge of the band or strip and keep the other edge thereof against the gages, substantially as described.

In testimony whereof we have signed our names to this specification in the presence of two subscribing witnesses.

SAMUEL E. MOWER.
THADDEUS FOWLER.

Witnesses:
HENRY G. THOMPSON,
TH. B. CANNON.